(12) United States Patent
Knight et al.

(10) Patent No.: US 7,733,878 B2
(45) Date of Patent: Jun. 8, 2010

(54) SYSTEM AND METHOD FOR PACKET TRANSMISSION FROM FRAGMENTED BUFFER

(75) Inventors: Brian Knight, Cambridge (GB); David Milway, Cambridge (GB); Chris Holland, St. Ives (GB)

(73) Assignee: Brooktree Broadband Holdings, Inc., Newport Beach, CA (US)

( * ) Notice: Subject to any disclaimer, the term of this patent is extended or adjusted under 35 U.S.C. 154(b) by 2054 days.

(21) Appl. No.: 10/614,109

(22) Filed: Jul. 8, 2003

(65) Prior Publication Data

US 2004/0008713 A1 Jan. 15, 2004

Related U.S. Application Data

(60) Provisional application No. 60/393,744, filed on Jul. 8, 2002.

(51) Int. Cl.
*H04L 12/28* (2006.01)

(52) U.S. Cl. .................... 370/395.7; 370/428

(58) Field of Classification Search .............. 370/396, 370/397, 349, 395.7, 428
See application file for complete search history.

(56) References Cited

U.S. PATENT DOCUMENTS

| | | | |
|---|---|---|---|
| 4,870,566 A | | 9/1989 | Cooper et al. |
| 5,638,367 A * | | 6/1997 | Gaytan et al. ............... 370/471 |
| 5,687,392 A * | | 11/1997 | Radko .......................... 710/22 |
| 6,023,738 A * | | 2/2000 | Priem et al. ................... 710/23 |
| 6,065,073 A | | 5/2000 | Booth |
| 6,198,746 B1 * | | 3/2001 | Saito .......................... 370/398 |
| 6,282,587 B1 * | | 8/2001 | Priem et al. ................... 710/23 |
| 6,314,477 B1 * | | 11/2001 | Cowger et al. ................ 710/22 |
| 6,650,624 B1 * | | 11/2003 | Quigley et al. .............. 370/252 |
| 2002/0038393 A1 | | 3/2002 | Ganapathy et al. |
| 2004/0213291 A1 * | | 10/2004 | Beshai et al. ................ 370/473 |
| 2006/0088056 A1 * | | 4/2006 | Quigley et al. .............. 370/468 |

OTHER PUBLICATIONS

International Search Report.

* cited by examiner

*Primary Examiner*—Kevin C Harper
*Assistant Examiner*—Sai-Ming Chan
(74) *Attorney, Agent, or Firm*—Thomas, Kayden, Horstemeyer & Risley, LLP

(57) ABSTRACT

The present invention is directed to methods and systems for implementing a DMA scheduling mechanism and a DMA system for transmission from fragmented buffers. According to an aspect of the present invention, a processor controls several devices via a polled interface to interleave DMA data transfers on different Input/Output (I/O) ports in an efficient manner. According to another aspect of the present invention, a system for handling transmission of network packets which are assembled from multiple memory buffers with different octet alignments is provided. The hardware/software combination allows efficient joining of packet fragments with differing octet alignments when the underlying memory system is word based, and further allows insertion of other data fields generated by a processor.

20 Claims, 13 Drawing Sheets

| | | |
|---|---|---|
| Table entry for Device A | Context pointer | Handler routine address |
| Table entry for Device A DMA | Context pointer | Handler routine address |
| Table entry for Device B | Context pointer | Handler routine address |
| Table entry for Device B DMA | Context pointer | Handler routine address |
| ⋮ | ⋮ | ⋮ |

| Version no. of structure | Allows PP to check format |
| PP→NP message queue | |
| NP→PP message queue | |
| Flow table address | Used by NP to find flows |
| NP flow handler routine addresses | Used by PP when setting up flows |
| Debug & monitoring | NP cpu meter. NP register dump |

☐ Written by PP   ☐ Written by NP

FIG. 4

| 7 state variables (to be preloaded into registers) Used for current buffer pointers cell counts, policing params, etc. | First part has a similar format in all flows. A flow is invoked by a single instructions: - loads 8 or 9 registers - jumps to handler routine |
| NP rx handler address | |
| NP tx handler address | |
| Current buffer | |
| Buffer source and/or destination | |
| Type, Flags | |
| Local buffer queue (switch flows) | |
| Other flow-specific data | |

FIG. 5

| OCTETS field in TX_ALIGN register | Least significant 2 bits of DMA address | KEEP ALIGN flag | TX_ALIGN register word at start | Next word from memory | TX_ALIGN register word after first memory cycle | Word written to FIFO |
|---|---|---|---|---|---|---|
| xx | 00 | 0 | xxxx.xxxx | pqrs.vwyz | XXXX.XX00 | pqrs.vwyz |
| xx | 01 | 0 | xxxx.xxxx | pqrs.vwXX | pqrs.vw01 | No write |
| xx | 10 | 0 | xxxx.xxxx | pqrs.XXXX | pqrs.XX02 | No write |
| xx | 11 | 0 | xxxx.xxxx | pqXX.XXXX | pqXX.XX03 | No write |
|  |  |  |  |  |  |  |
| 00 | 00 | 1 | xxxx.xx00 | pqrs.vwyz | XXXX.XX00 | pqrs.vwyz |
| 00 | 01 | 1 | xxxx.xx00 | pqrs.vwXX | pqrs.XX01 | No write |
| 00 | 10 | 1 | xxxx.xx00 | pqrs.XXXX | pqrs.XX02 | No write |
| 00 | 11 | 1 | xxxx.xx00 | pqXX.XXXX | pqXX.XX03 | No write |
|  |  |  |  |  |  |  |
| 01 | 00 | 1 | ghij.k101 | pqrs.vwyz | pqrs.vw01 | yzgh.jjkl |
| 01 | 01 | 1 | ghij.k101 | pqrs.vwXX | pqrs.XX02 | vwgh.jjkl |
| 01 | 10 | 1 | ghij.k101 | pqrs.XXXX | pqXX.XX03 | rsgh.jjkl |
| 01 | 11 | 1 | ghij.k101 | pqXX.XXXX | XXXX.XX00 | pqgh.jjkl |
|  |  |  |  |  |  |  |
| 10 | 00 | 1 | ghij.xx02 | pqrs.vwyz | pqrs.XX02 | vwyz.ghii |
| 10 | 01 | 1 | ghij.xx02 | pqrs.vwXX | pqXX.XX03 | rsvw.ghii |
| 10 | 10 | 1 | ghij.xx02 | pqrs.XXXX | XXXX.XX00 | pqrs.ghii |
| 10 | 11 | 1 | ghij.xx02 | pqXX.XXXX | pqgh.ii01 | No write |
|  |  |  |  |  |  |  |
| 11 | 00 | 1 | ghxx.xx03 | pqrs.vwyz | pqXX.XX03 | rsvw.yzgh |
| 11 | 01 | 1 | ghxx.xx03 | pqrs.vwXX | XXXX.XX00 | pqrs.vwgh |
| 11 | 10 | 1 | ghxx.xx03 | pqrs.XXXX | pqrs.gh01 | No write |
| 11 | 11 | 1 | ghxx.xx03 | pqXX.XXXX | pqgh.XX02 | No write |

FIG. 10

| OCTETS field in TX_ALIGN register | TX_ALIGN register word at start | Word written to FIFO register | FIFO register written | TX_ALIGN after FIFO register write | Word written to FIFO |
|---|---|---|---|---|---|
| 00 | xxxx.xx00 | pqrs.vwyz | TX_FIFO0 | XXXX.XX00 | pqrs.vwyz |
| 00 | xxxx.xx00 | XXrs.vwyz | TX_FIFO1 | rsvw.yz01 | No write |
| 00 | xxxx.xx00 | XXXX.vwyz | TX_FIFO2 | vwyz.XX02 | No write |
| 00 | xxxx.xx00 | XXXX.XXyz | TX_FIFO3 | yzXX.XX03 | No write |
| 01 | ghij.k101 | pqrs.vwyz | TX_FIFO0 | pqrs.vw01 | yzgh.ijkl |
| 01 | ghij.k101 | XXrs.vwyz | TX_FIFO1 | rsvw.XX02 | yzgh.ijkl |
| 01 | ghij.k101 | XXXX.vwyz | TX_FIFO2 | vwXX.XX03 | yzgh.ijkl |
| 01 | ghij.k101 | XXXX.XXyz | TX_FIFO3 | XXXX.XX00 | yzgh.ijkl |
| 10 | ghij.xx02 | pqrs.vwyz | TX_FIFO0 | pqrs.vw02 | vwyz.ghij |
| 10 | ghij.xx02 | XXrs.vwyz | TX_FIFO1 | rsXX.XX03 | vwyz.ghij |
| 10 | ghij.xx02 | XXXX.vwyz | TX_FIFO2 | XXXX.XX00 | vwyz.ghij |
| 10 | ghij.xx02 | XXXX.XXyz | TX_FIFO3 | pqgh.ij01 | No write |
| 11 | ghxx.xx03 | pqrs.vwyz | TX_FIFO0 | pqXX.XX03 | rsvw.yzgh |
| 11 | ghxx.xx03 | XXrs.vwyz | TX_FIFO1 | XXXX.XX00 | rsvw.yxgh |
| 11 | ghxx.xx03 | XXXX.vwyz | TX_FIFO2 | vwyz.gh01 | No write |
| 11 | ghxx.xx03 | XXXX.XXyz | TX_FIFO3 | yzgh.XX02 | No write |

FIG. 11

SYSTEM AND METHOD FOR PACKET TRANSMISSION FROM FRAGMENTED BUFFER

CROSS-REFERENCE TO RELATED APPLICATIONS

The present invention claims benefit of U.S. Provisional Application No. 60/393,744, filed Jul. 8, 2002, the entirety of which is incorporated by reference herein.

FIELD OF THE INVENTION

The present invention relates generally to a Direct Memory Access (DMA) scheduling mechanism and, more particularly, to implementing a DMA scheduling mechanism and a DMA system for transmission from fragmented buffers.

BACKGROUND OF THE INVENTION

Network packets normally comprise a sequence of 8-bit octets. In order to allow high data transfer rates, it is desirable for a DMA system to transfer data in larger units. Thus, data paths between a DMA and a buffer memory, and the DMA and a First In-First Out (FIFO) buffer, are one 'word' wide. The DMA generally reads only whole words from the memory and only words that are properly aligned to word boundaries (e.g. words whose octet addresses are a multiple of four (or other multiple)).

In a buffer memory, a packet may contain an arbitrary number of octets and may be incompatible with word access in a variety of ways. For example, the packet may be badly aligned in memory. In another example, the packet may not start on a word boundary (e.g., a start address may not be a multiple of four). Therefore, when the DMA reads the word containing the first octet, it will also receive one or more unwanted octets.

The packet data may not be contiguous in memory and may be held as several fragments with arbitrary alignments and arbitrary sizes (not necessarily a multiple of the word size). This is a common situation where the processor is transferring packets received from another source. The transfer may involve changing the packet's protocol encapsulation by adding and/or removing octets to/from the start and end of the packet, while preserving the payload data in the middle of the packet. It is expensive to achieve this while keeping the whole packet contiguous in memory (as it may need to be copied to a new, larger buffer). An alternative is to represent the packet as a list of fragments (e.g. header, payload, trailer) in separate memory buffers.

The processor may also need to perform protocol conversion which involves inserting a small number of octets into an existing packet. Examples of this may include priority and Virtual Local Area Network (VLAN) tags in Ethernet standards 802.1p and 802.1q. However, it is generally unduly expensive to achieve this by manipulating memory buffers and copying data.

Therefore, there is a need for a more efficient method and system for implementing a DMA scheduling mechanism and a DMA system for transmission from fragmented buffers.

SUMMARY OF THE INVENTION

Aspects of the present invention overcome the problems noted above, and realize additional advantages. In one exemplary embodiment, the present invention is directed to methods and systems for implementing a DMA scheduling mechanism and a DMA system for transmission from fragmented buffers. According to an aspect of the present invention, a processor controls several devices via a polled interface to interleave DMA data transfers on different Input/Output (I/O) ports in an efficient manner. According to another aspect of the present invention, a system and method for handling transmission of network packets which are assembled from multiple memory buffers with different octet alignments are provided. The hardware/software combination allows efficient joining of packet fragments with differing octet alignments when the underlying memory system is word based, and further allows insertion of other data fields generated by a processor.

In accordance with one embodiment of the present invention, a method for scheduling at least one data transfer for a plurality of input/output (I/O) devices, each I/O device having a direct memory access (DMA) controller and being associated with one or more network ports, is provided. The method comprises the steps of polling, from a device interface, the plurality of I/O devices to receive status inputs from the I/O devices, selecting an I/O device to be serviced based at least in part on the status inputs and storing a first identifier associated with the selected I/O device in a first register of the device interface. The method further comprises accessing, at a processor, the first identifier from the first register of the device interface, selecting a handler routine from a plurality of handler routines based at least in part on the first identifier, and executing the selected handler routine at the processor to process a data transfer with the selected I/O device or DMA controller.

In accordance with another embodiment of the present invention, a system for scheduling a data transfer for at least one of a plurality of input/output (I/O) devices, each I/O device having a direct memory access (DMA) controller and being associated with at least one network port, is provided. The system comprises a device interface operably connected to the plurality of I/O devices and being adapted to poll the plurality of I/O to receive status inputs from the I/O devices, select an I/O device to be serviced based at least in part on the status inputs and store a first identifier associated with the selected I/O device in a first register of the device interface. The system further comprising a processor operably connected to the device interface and being adapted to access the first identifier from the first register of the device interface, select a handler routine from a plurality of handler routines based at least in part on the first identifier, and execute the selected handler routine to process a data transfer with the selected I/O device.

In accordance with an additional embodiment of the present invention, a communications processor is provided. The communications processor comprises a plurality of input/output (I/O) devices, each I/O device comprising a direct memory access (DMA) controller and at least one network port. The communications processor further comprises a device interface operably connected to the plurality of I/O devices and having a first register, the device interface being adapted to poll the plurality of I/O devices to receive status inputs from the I/O devices and DMA controllers, select an I/O device to be serviced based at least in part on the status inputs and store a first identifier associated with the selected I/O device in a first register of the device interface. The communications processor additionally comprises means for selecting a handler routine from a plurality of handler routines based at least in part on the first identifier and means for executing the selected handler routine to process a data transfer with the selected I/O device.

In accordance with yet another embodiment of the present invention, a method for transferring network packet data stored in memory to an output device is provided. The method comprises the steps of concatenating one or more packet data octets from at least a first data word having at least one packet data octet to be included in a network packet to generate a first sequence of packet data octets having an octet length at least as great as an octet length of a data word and storing the first sequence of packet data octets in a FIFO buffer operably connected to the output device when the octet length of the sequence of packet data octets is equal to the octet length of a data word. The method further comprises storing a first subset of packet data octets from the first sequence of packet data octets in the FIFO buffer and storing a remaining second subset of packet data octets from the first sequence in an alignment register when the octet length of the first sequence of packet data octets exceeds the octet length of a data word, wherein an octet length of the first subset of packet data octets is equal to the octet length of a data word.

In accordance with an additional embodiment of the present invention, a system for transferring network packet data stored in memory to an output device is provided. The system comprises a direct memory access (DMA) interface for accessing a set of data words stored in memory, each data word having at least one valid octet to be included in a network packet and each data word being accessed using a DMA address associated with the data word and a first in-first out (FIFO) buffer for storing network packet data to be transmitted by the output device. The system further comprises an alignment block having at least one alignment register, wherein the alignment register for storing at least one data octet, and wherein the alignment block is adapted to concatenate one or more packet data octets from at least a first data word having at least one packet data octet to be included in a network packet to generate a first sequence of packet data octets having an octet length at least as great as an octet length of a data word, store the first sequence of packet data octets in a FIFO buffer operably connected to the output device when the octet length of the sequence of packet data octets is equal to the octet length of a data word and store a first subset of packet data octets from the first sequence of packet data octets in the FIFO buffer and storing a remaining second subset of packet data octets from the first sequence in an alignment register when the octet length of the first sequence of packet data octets exceeds the octet length of a data word, wherein an octet length of the first subset of packet data octets is equal to the octet length of a data word.

The accompanying drawings, which are incorporated in and constitute a part of this specification, illustrate various embodiments of the invention and, together with the description, serve to explain the principles of the invention.

BRIEF DESCRIPTION OF THE DRAWINGS

The present invention can be understood more completely by reading the following Detailed Description of the Invention, in conjunction with the accompanying drawings, in which:

FIG. 4 is an illustration of communication between a protocol processor and a network processor as a shared structure at a fixed memory address, in accordance with the present invention.

FIG. 5 is an illustration of a flow structure representing a network data stream in accordance with the present invention.

FIG. 10 is an illustration of a table depicting alignment register interaction with DMA memory address alignment in accordance with the present invention.

FIG. 11 is an illustration of a table depicting alignment register interaction with FIFO registers in accordance with the present invention.

DETAILED DESCRIPTION OF THE INVENTION

The following description is intended to convey a thorough understanding of the invention by providing a number of specific embodiments and details related to a DMA scheduling mechanism. It is understood, however, that the invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

According to one embodiment, the present invention provides a processor that controls several devices via a polled interface to interleave DMA data transfers on different Input/Output (I/O) ports in an efficient manner. An aspect of the present invention is designed for a polled (rather than interrupt-driven) system in the arbitration between DMA completion requests and service requests from other devices and in the provision of separate handler and context pointers for each request so that DMA completion may proceed efficiently.

Figure 1:
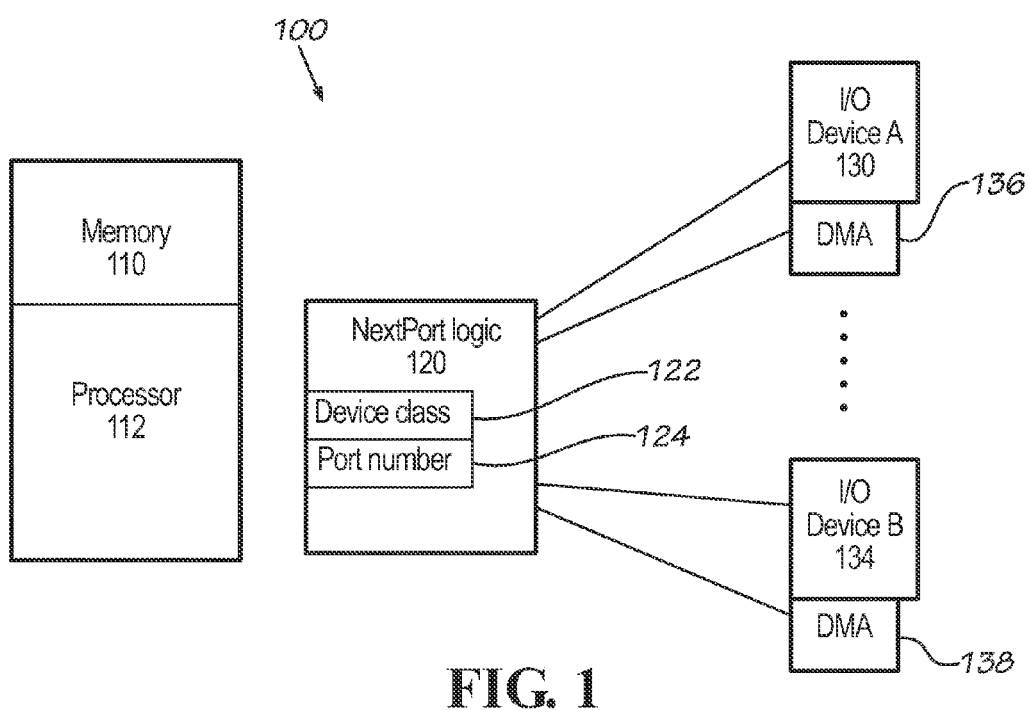
FIG. 1 is an illustration of a system for implementing DMA scheduling in accordance with the present invention.

Another embodiment of the present invention relates to a network processor and I/O ports of a communications processor. FIG. 1 is a diagram of a system 100 for implementing DMA scheduling in accordance with the present invention. A processor 112 controls low level data transfer to and from the I/O devices (e.g., I/O devices 130 and 134), with its own local memory 110 for program and data. A complete communications processor system may typically include one or more "network processors" such as this, together with a "protocol processor" to handle higher-level operations on the data packets. A device interface 120, referred to herein as the "NextPort logic 120" 120, may arbitrate between the I/O devices 130, 134 requiring service, and further choose which device should be serviced next. The NextPort logic 120 may also include registers, such as a device class register 122 and a port number register 124. A number of I/O devices 130, 134 may each be associated with one or more external network ports. For explanatory purposes, the I/O devices 130, 134 are discussed herein as devices that transfer data in one direction only, so a typical network interface may include two or more of such devices at this level (e.g., a transmitter and a receiver). Each I/O device 130, 134 may have an associated a DMA (Direct Memory Access) controller (e.g., DMA controllers 136, 138, respectively) for transferring data between a buffer memory and the associated I/O device without intervention by processor 112.

Processor 112 may handle a low-level transmission and reception of data on multiple network ports, such as, for example, Universal Test and Operations Physical Interface for Asynchronous Transfer Mode (UTOPIA), High-Level Data Link Control (HDLC), Universal Serial Bus (USB), and the like. Processor 112 may be responsible for scheduling the servicing of ports to avoid data overrun or underrun, and for operations such as segmentation and reassembly of packets on Asynchronous Transfer Mode (ATM) interfaces, as well as the insertion and checking of checksums.

Processor 112 effectively replaces dedicated hardware that would otherwise be needed to handle the ports. Advantages of having a programmable port controller may include the ability to adapt to changing requirements and standards and to work around hardware defects without re-spinning the chip.

The processor software may be organized as a polling loop which inspects the possible sources of work in turn. In this example, the code does not use interrupts. This potentially introduces some latency in the handling of high priority ports, but has substantial benefits. In particular, the processor software provides more controlled behaviour under overload. Excess traffic from one network port cannot monopolize the processor, so the processor may continue to service other ports and continue to respond to messages from other processors in the system. Since the software remains in control, it can also take action to limit the amount of time it spends on the overloaded port.

In addition, each processor operation preferably is guaranteed to be atomic. Each section of processor code therefore may run to completion without interrupt, thereby eliminating the need for any lock mechanism when manipulating shared resources. Also, the processor software preferably allows for low scheduling overhead. Each section of code relinquishes control voluntarily at convenient points. Accordingly, each code unit may save and restore exactly the state it needs, thereby avoiding the expense of a generalized context switch.

The work of the processor may be divided into relatively small segments (e.g. taking around 1 microsecond to execute). The unit of work typically includes starting a DMA operation or performing processing required after a DMA has completed. This fine time-slicing typically connotes that no port operation typically will lock out servicing of other ports for a long period.

The NextPort logic 120 of the present invention gives the processor a very rapid process for selecting an appropriate port to service next. In software alone, this selection would often be more expensive than the actual operation to be performed on the port.

The NextPort logic 120, in one embodiment, takes status inputs from the I/O devices 130, 134 and their respective DMA controllers 136, 138. The status inputs may include indicators of: (1) whether the device or DMA needs servicing (e.g., if a reception device has data waiting, a transmission device has space for more data, or a DMA operation has completed); (2) (for multi-port devices such as UTOPIA) which ports within the device need servicing; and (3) the priority with which the port needs servicing—typically this may be related to how soon its reception buffer will be full or its transmission buffer will run out of data to send.

The NextPort logic 120 combines these inputs taking account of the priorities and also may apply a round-robin algorithm or other scheduling algorithm to request the same priority for fairness. The result may be presented to the processor in two registers, such as the device class register 122 and the port number register 124. The device class register 122 contains the I/O device to service (e.g., UTOPIA receiver). The port number register 124 provides the port number to service (or 0 if device has only one port). The act of reading these registers, in one embodiment, triggers the NextPort logic 120 to run its selection algorithm again.

Dispatch software executed by the processor 112 reads the two hardware NextPort registers 122, 124 to choose which port it will service next. As it is software, the dispatch software may perform more complex operations. For example, one port may be favored over another if it is known to be faster than the others. The NextPort logic 120 may then call the appropriate handler routine for the chosen transmission or reception port, passing the port number as an argument.

Figures 2, 3:
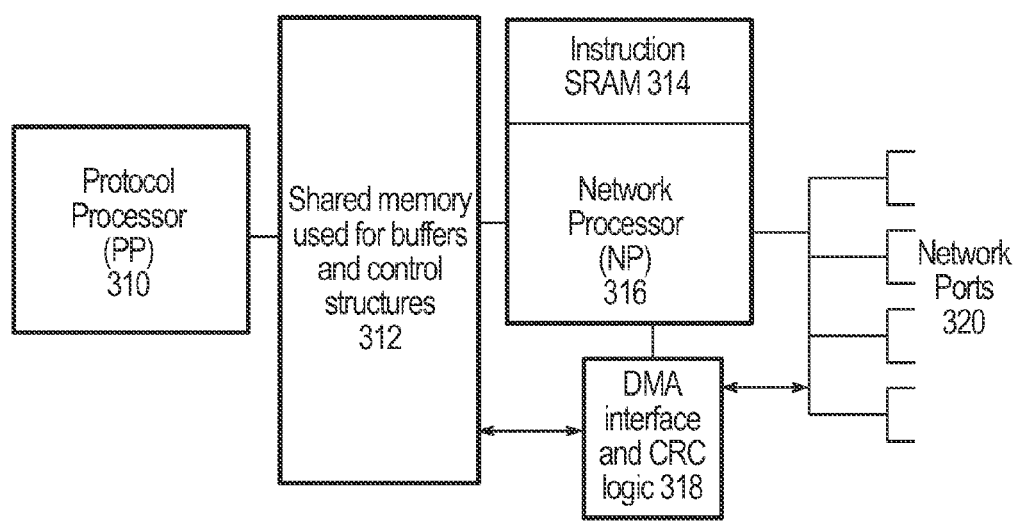
FIG. 2 is an illustration of a table of context pointers and handler routine addresses in accordance with the present invention.
FIG. 3 is an illustration of a network processor in a dual-processor communications system in accordance with the present invention.

As illustrated in FIG. 2, the value returned in the device class register 122 may include a pointer into a table in the processor's memory. Each table entry may correspond to an I/O device and/or the DMA controller of the I/O device. A table entry may contain two values or more values, such as a context pointer and a handler routine address. Other values may be included as well. A context pointer (e.g., a memory address) may generally point to a data structure containing the state of the current operation on the I/O device or DMA controller. The harder routine address may include the address of a software handler routine to service this device or DMA.

The overall operation of the NextPort dispatch software may include the following steps: (1) Read the two NextPort registers (e.g., device class and port number registers 122, 124); (2) Read the context pointer and handler routine address from the table entry addressed by the device class register 122; and (3) execute the handler routine by jumping to the handler routine address with the port number and context pointer as arguments.

In one implementation, this sequence may be implemented efficiently as two load-multiple-register operations on the processor 112. The first operation loads the device class and port number into two processor registers. The second operation loads the context pointer into a processor register and loads the handler routine address into the processor's program counter, thereby immediately causing a branch to that routine with the port and context already in processor registers.

Some entries in the table of FIG. 2 may be static, e.g., set up once when the system starts. Other entries may be rewritten dynamically, to refer directly to the handler routine and context that will be needed next (in effect implementing a state machine). This is particularly useful for DMA completion, as described below.

Servicing an I/O port may typically include at least two stages. An example is reception of an ATM cell from a UTOPIA port. In this example, the processor 112 reads the NextPort registers 122, 124 and is notified that a UTOPIA port has received a cell. This invokes (via the NextPort table) a handler routine which identifies the data stream to which this cell belongs and starts the UTOPIA reception DMA controller to copy the cell into a memory buffer. While the DMA is proceeding, the handler routine also may rewrite the table entry for UTOPIA reception DMA with a context pointer which points to the control data structure for this particular data stream and a handler routine address corresponding to the type of data stream (e.g., AAL5) to which this cell belongs. A later read of the NextPort registers 122, 124 notifies the processor 112 that the UTOPIA reception DMA is complete. Via the NextPort table, this invokes the handler routine and context set up above. Since this handler routine is specific to the data stream and has direct access to the stream's control data structure, it can handle the required DMA completion operations (such as storing a partial checksum, or delivering a complete buffer, for example) efficiently without having to do further tests or searches.

The processor 112 may service other I/O devices, and perform DMA operations on other devices, between operations discussed above. Handling the DMA completion may be scheduled by the NextPort logic 120 according to the priorities of other outstanding requests for service.

The design of a software-driven communications processor involves balancing the need to service multiple network ports in a timely fashion with the need to degrade service in a controlled way when subjected to overload.

According to another embodiment of the present invention, a system involves software for a network processor in a communications processor Application Specific Integrated Circuit (ASIC). The flow of control in the processor preferably is a polling loop, but has hardware assistance which helps it to make a rapid decision about what to do next. Advantages of this approach include a low scheduling overhead, no locking needed between separate 'threads', and more control over behaviour under overload, among other advantages.

The present invention provides an efficient way to schedule operations within a network processor which gives predictable behavior under overload. In particular, the present invention provides for the application to multiple network ports of different types; an exact form of the main scheduling loop, designed to give a (roughly) controlled apportioning of processor time with very low scheduling cost; and a way in which a flow mechanism is used to multiplex operations on different ports and data streams.

FIG. 3 illustrates a Network Processor (NP) in a dual-processor communications system in accordance with the present invention. The NP 316 handles the low-level transmission and reception of data on multiple network ports 320 (e.g., ATM, Ethernet, HDLC, PCI, USB, etc.). In this example, a Protocol Processor (PP) 310 is in communication with a shared memory 312 used for buffers and control structures. The shared memory 312 is in communication with NP 316. DMA interface and Cyclic Redundancy Check (CRC) logic 318 is in communication with shared memory 312 as well as network ports 320. NP 316 is responsible for scheduling the servicing of the ports to avoid data overrun or under-run, and for operations such as segmentation and reassembly of packets on ATM interfaces, and insertion and checking of checksums. According to one example, the NP 316 may be concerned with data transfer where all port control is performed by a separate protocol processor(s).

The NP effectively replaces the dedicated hardware that would otherwise be needed to handle the ports. Advantages of having a programmable port controller include the abilities to adapt to changing requirements and standards and to work around hardware defects without re-spinning the chip.

The NP 316 may include a variety of hardware interfaces, such as network ports; a "Next Port" register which suggests which port may be serviced next (based on the current state of the data FIFOs for each port); private Static Random Access Memory (SRAM) for instructions; memory shared with the rest of the system (protocol processor); and a "doorbell" for signalling (and being signalled by) the protocol processor.

Inputs from the sources of work for the NP may include a network port requiring servicing where the NextPort register provides the basic priority scheduling for ports; doorbell rings where a message has been received from the PP; and timer expiration where timing is also used for 'virtual' ports (e.g., for propagating multicast streams) and for some housekeeping operations.

According to an example of the present invention, the NP 316 does not utilize an operating system. The NP software may be organized as a polling loop which inspects the possible sources of work in turn. In this example, the code does not use interrupts. This potentially introduces some latency in the handling of high priority ports, but has substantial benefits, which may include providing more controlled behavior under overload. An excess of traffic from one network port cannot monopolize the processor, so the NP can continue to service other ports, and can continue to respond to messages from the PP 310. Since the software remains in control, it can also take action to limit the amount of time it spends on the overloaded port.

Another advantage is that each NP operation preferably is guaranteed to be atomic. Each section of NP code therefore may run to completion without interruption, thereby eliminating the need for any locking when manipulating shared resources. Another advantage is low scheduling overhead where each section of code relinquishes control voluntarily at convenient points. This means each code unit can save and restore exactly the state it needs, avoiding the expense of a generalized context switch.

The work of the NP may be divided into small segments (e.g., taking around 1 microsecond). For ATM ports the unit of work is sending or receiving one cell. One other network ports, the unit is sending or receiving a fragment (e.g., 64 bytes) of a data packet. This fine time-slicing means that no port operation will lock out servicing of other ports for a long period.

The main control loop of the NP may include a table of addresses of handler routines. Examples may include the following:

NextPort handler address
NextPort handler address
NextPort handler address
NextIRQ handler address
NextPort handler address
NextPort handler address
Monitoring handler address
NextPort handler address
Wrap handler address The relative numbers of entries for each handler address may control the amount of processor time given to each source of work under heavy load. The entire scheduling state of the NP may be held in one processor register, which points at the next entry in this table. Each handler returns to the scheduler by executing a machine instruction which loads the program counter from the scheduling register (thus jumping to the next handler) and increments the scheduling register.

The NextPort handler transmits or receives one small unit of data on one network port, as described below. The NextIRQ handler services interrupt sources such as a Doorbell and a timer. It may use hardware assistance to make a rapid selection of the highest priority interrupt source. The "interrupts" may be handled by software polling, so they do not dominate the scheduling. The Monitoring handler may be used for performance monitoring and debugging. One of its functions is to maintain a measure of CPU usage on the NP. The Wrap Handler may set the scheduling register back to the start of the loop. This eliminates an end-of-loop test that would otherwise be needed each time the scheduling register was incremented. The cost of the Wrap Handler is very small if the loop is reasonably large.

The NextPort handler reads the hardware NextPort register as a very rapid method of selecting an appropriate port to service next. As it is a software handler, it may perform more complex operations (e.g., favoring one port that is known to be faster than the others). It may call an appropriate handler for a chosen transmission or reception port.

The port handler may identify the flow structure for the next data transfer and use a single machine instruction to load the flow's state into registers and further call the flow's handler.

Network ports such as Ethernet may have one transmission flow and one reception flow. ATM ports are more complex, having one flow for each data stream (e.g., virtual channel). The present invention may be implemented in other applications as well.

A doorbell may be used for a simple message protocol between the PP 310 and the NP 316. Types of messages may include event notification (e.g., new buffer available); access to NP memory or device registers (e.g., PP requests the NP to perform an operation the PP is unable to perform); and atomic operations (e.g., the PP needs to perform some operations atomically with respect to network data Transmit (Tx)/Receive (Rx)).

FIG. 4 is an illustration of communication between PP and NP as a shared structure at a fixed memory address, in accordance with one aspect of the present invention. As shown in FIG. 4, PP->NP message queue and flow table addresses are written by the PP whereas version number of structure, NP->PP message queue, NP flow handler routine addresses and debug & monitoring are written by the NP.

FIG. 5 is an illustration of a flow structure representing a network data stream (e.g., an ATM VC) in accordance with the present invention. In addition, FIG. 5 illustrates a logical unit of scheduling within the NP. Loading a flow's state and calling its handler may be achieved by a single machine instruction.

Figure 6:
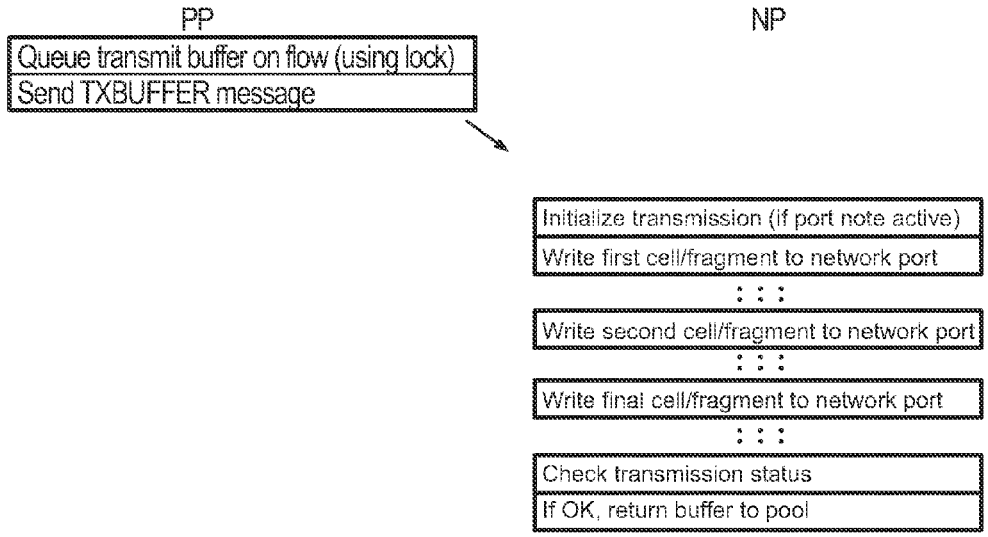
FIG. 6 is an illustration of an exemplary packet transmission in accordance with the present invention.

FIG. 6 is an example of a packet transmission in accordance with one aspect of the present invention. At the PP, a queue transmit buffer on flow is performed and a TX BUFFER message is sent. At the NP, transmission is initialized (if a port is not active). Also, a first cell/fragment is written to a network port. A second cell/fragment is written to a network port. A final cell/fragment is written to a network port. Transmitter status may be checked. If the transmitter status is okay, the buffer is returned to the pool. These steps may be interleaved with operations on other flows and ports.

Figure 7:
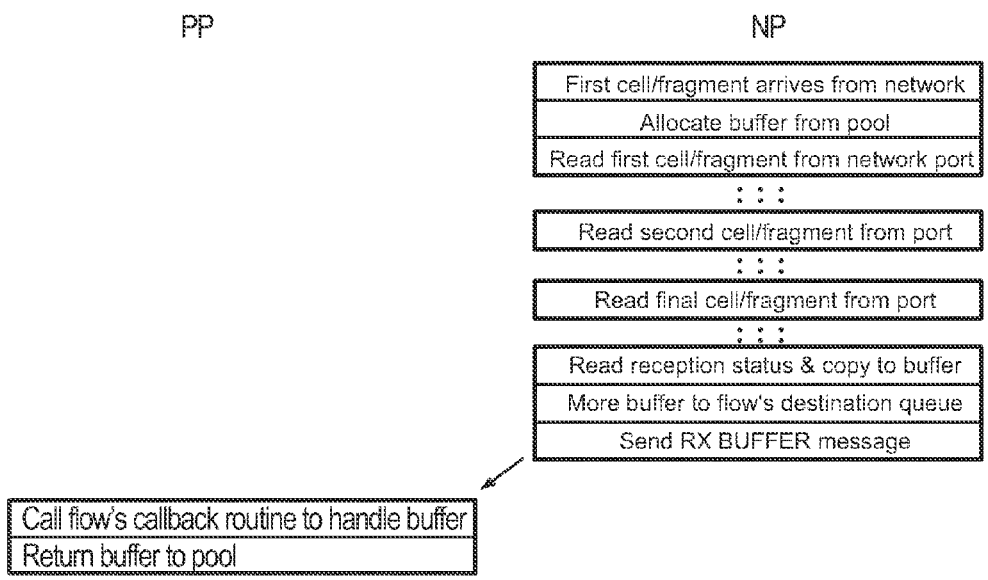
FIG. 7 is an illustration of an exemplary packet reception in accordance with the present invention.

FIG. 7 is an example of a packet reception in accordance with one aspect of the present invention. At the NP, a first cell/fragment arrives from the network. Buffer from the pool may be allocated. A first cell/fragment from a network port may be read. A second cell/fragment from a port may be read and a final cell/fragment from a port may be read. Reception status may be read and copied to the buffer. The buffer may be moved to a flow's destination queue. A RX BUFFER message may be sent. At the PP, a flow's callback routine may be called to handle the buffer. The buffer is then returned to the pool.

According to at least one embodiment of the present invention, a system and method for handling transmission of network packets which are assembled from multiple memory buffers with different octet alignments are provided. The hardware/software combination allows efficient joining of packet fragments with differing octet alignments when the underlying memory system is word based, and further allows insertion of other data fields generated by a processor.

An embodiment of the present invention provides an efficient solution to the problem of concatenating data fragments when transmitting a network packet from multiple, differently aligned, buffers in a word-based memory system. The present invention provides a split solution between hardware and software in a way that allows a software device driver to be straightforward and fast in execution, without requiring hardware of excessive size or complexity.

Figure 8:
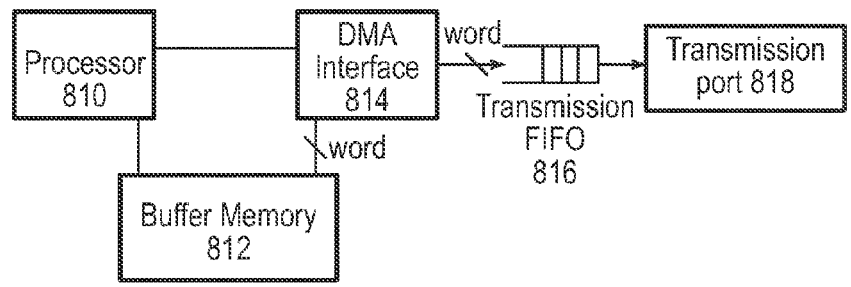
FIG. 8 is an illustration of a system for implementing DMA interface in accordance with the present invention.

FIG. 8 is an illustration of a system for implementing DMA interface, in accordance with the present invention. The environment in which the present invention may be implemented is a DMA interface 814 between a processor 810 and an output device such as a network transmission port 818, according to one embodiment of the present invention. There is a buffer memory 812 in which processor 810 constructs packets for transmission. Processor 810 has a control interface to DMA interface 814 (e.g., as a set of memory-mapped registers). DMA interface 814 has direct access to buffer memory 812 so it can read packet data without processor intervention. The DMA interface 814 reads data from buffer memory 812 and transfers it to transmission port 818 via a FIFO 816.

Although network packets normally comprise a sequence of 8-bit octets, in order to allow high data transfer rates it is desirable for the DMA system to transfer data in larger units. Thus the data paths between the DMA and buffer memory, and the DMA and FIFO, are one 'word' wide. The following description assumes that a data word consists of four octets (32 bits), as in the preferred implementation, but the same principles may apply to other word sizes, typically a multiple integer of four. The DMA may read only whole words from the memory, and may read only words properly aligned to word boundaries (e.g., words whose octet addresses are a multiple of 4).

This wide data path is efficient, but may lead to the problem (e.g., inherent inefficiencies). In the buffer memory, a packet may have an arbitrary octet length and may be incompatible with the word access in a variety of ways. For example, the packet may be badly aligned in memory. For example, it may not start on a word boundary (e.g., a start address may not be a multiple of 4). This means that when the DMA reads the word containing the first octet, it will also get one or more unwanted octets.

The packet data may not be contiguous in memory and may be held as several fragments with arbitrary alignments and arbitrary octet lengths (not necessarily a multiple of the word size). This is a common situation where the processor is transferring packets received from another source. The transfer may involve changing the packet's protocol encapsulation by adding and/or removing octets to/from the start and end of the packet, while preserving the payload data in the middle of the packet.

The possibilities that the packet size may not be a multiple of the octet length of the data word or that the packet may not end at a word boundary in memory, are less significant. In general, DMA systems read a whole number of words from memory and transfer a whole number of words into the FIFO, and the transmission port ignores any excess octets in the last word.

A packet in memory and on a network connection may be considered an ordered sequence of octets. As data is handled as data words, another consideration is the question of "endianness"—the order of octets within a data word. One implementation is "little-endian", which means that the octet with the lowest memory address (or which is earliest in the network packet) is placed at the least significant end of the word (e.g., at the right hand end of the word in diagrams or in the hexadecimal representation of a word value). The following description assumes a little-endian system. However, the principles of the present invention are equally applicable to a "big-endian" system, in which the lowest-addressed (e.g., earliest) octet is held at the most significant (left hand end) of a word.

Figure 9:
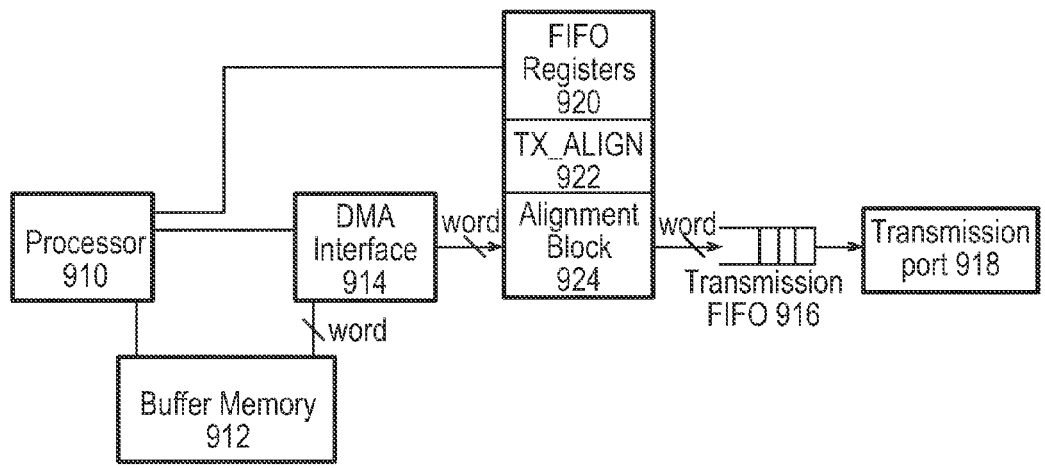
FIG. 9 is an illustration of a system implementing alignment logic between a DMA system and a FIFO in accordance with the present invention.

FIG. 9 is a block diagram of a system implementing an alignment interface between a DMA system and a FIFO in accordance with the present invention. An alignment interface (denoted herein as a combination of alignment block 924, alignment register 922 and FIFO registers 920) is controlled by a DMA interface 914. Processor 910 may use registers to insert data into the FIFO without using DMA. In particular, processor 910 may insert data to FIFO registers 920, thereby bypassing DMA interface 914.

The alignment register (TX_ALIGN) 922 may hold one or more octets (e.g., 1, 2 or 3 octets) which are en route to a transmission FIFO buffer 916. However, the octets preferably are not transferred until a complete word is formed, as described in further detail below.

A DMA transfer may be controlled by a predetermined number of values (e.g., 4 values) written to DMA interface registers by a processor. In one implementation of the present invention, these values may be packed into a plurality of registers (e.g., two registers). The DMA control values may include the following:

TABLE 1

DMA Control Values

| | |
|---|---|
| DMA Address | The memory address of the first octet to be transferred. The least significant 2 bits of this address give the alignment relative to word boundaries in memory, and are used by the alignment logic. |
| DMA Length | The number of octets to be transferred. |
| ALIGN_KEEP flag | A flag which is set to cause the current contents of the TX_ALIGN register to be used. If this flag is unset, the TX_ALIGN register is cleared before the DMA transfer begins. This flag is normally unset for the first fragment of a packet and set for the second and subsequent fragments. |
| LAST flag | A flag which is set to indicate that this DMA transfer is the final fragment of a network packet. It controls whether or not the final contents of the TX_ALIGN register are flushed to the FIFO. |

The DMA system takes account of the address alignment and the length to determine which memory words it can read to retrieve the buffer fragment. If the buffer does not start on a word boundary, the number of memory words may be one more than is implied by the length alone.

The alignment register 922 may contain any octets from the DMA Length which have not yet gone to the FIFO.

TABLE 2

| | Alignment Register TX_ALIGN Register | |
|---|---|---|
| Bit | Name | Description |
| 31-24 | OCTET3 | Third octet |
| 23-16 | OCTET2 | Second octet |
| 15-8 | OCTET1 | First octet |
| 7-2 | Unused | |
| 1-0 | OCTETS | Number of octets held in alignment register. 00 = None valid 01 = Octet 3, 2 and 1 valid 10 = Octet 3 and 2 valid 11 = Octet 3 valid |

Table 2 above shows an exemplary layout of the alignment register 922 according to one implementation, which is also the layout assumed in the description below. However, other layouts of the alignment register 922 may be implemented in accordance with the present invention.

The alignment register 922 may hold octets that have not yet been written to the network FIFO 916. The register 922 preferably may hold between 0 and 3 octets (or other number of octets) and an indication of how many octets. The DMA system reads whole words from memory. Depending on the initial contents of the alignment register and the alignment of the buffer address, there may be, for example, 1, 2 or 3 octets left at the end of the DMA.

The alignment register 922 is normally reset at the start of a DMA cell transfer. It retains its value at the end of a DMA. At the start of a new DMA, the ALIGN_KEEP flag indicates that the contents should be kept. This allows non-aligned buffer fragments to be concatenated automatically. Data may also be written through this register to the network device FIFO 916 by writing to one of four FIFO registers. The number of octets written may depend on the register used.

The alignment register 922 may be read and written to by the processor. This may be needed on network ports (e.g., ATM cell ports) which allow interleaved transmission of packets from separate data streams. The driver software in the processor may hold separate saved copies of the alignment register for each data stream and restore an appropriate previous value to the hardware Alignment Register before each transfer.

FIG. 10 is a table illustrating alignment register interaction with DMA memory address alignment in accordance with the present invention. The table 1000 of FIG. 10 shows how the alignment register is affected by valid alignment octets and address alignment during the DMA transfer of one word from buffer memory. In this example, the word values are little-endian and are shown as hexadecimal numbers, while register fields are shown in binary. "X" indicates a "don't care" value. Lower-case letters are used for arbitrary hexadecimal digits so it is possible to see the movements of individual octets. A dot '.' in the middle of a hexadecimal number is used simply for visual clarity.

The FIFO registers 920 provide an alternative route for the processor to insert data into the transmission FIFO 916. There are several situations where data has to be inserted into the transmission stream, but where it would be inconvenient or unduly expensive to achieve this by first writing the data into a memory buffer and then setting up a DMA.

One example is ATM cell transmission using ATM Adaptation Layer 5 (AAL5). The payload of a packet is in buffer memory, but the transmission may be broken into ATM cells, each containing a 4-octet header and 48 octets of the packet payload, for example. (The header may be actually 5 octets "on the wire" where the $5^{th}$ octet is generated and removed by hardware so is not seen in a software driver.) Another example is the 802.1p and 802.1q frame formats for Ethernet frames, which incorporate extra tag fields into normal Ethernet frames to hold VLAN identifier and priority information. If a conventional Ethernet frame is received from another source, it will be contiguous in memory. If the driver has to transmit the frame in 802.1p/q format, the driver may have to insert the extra octets at the time of transmission.

According to an example of the present invention, there are four separate FIFO registers, allowing the insertion of 1, 2, 3 or 4 extra octets into the transmitted data stream. Other number of FIFO registers may be implemented as well.

TABLE 3

TX_FIFO0 Register

| Bit | Name | Description |
| --- | --- | --- |
| 31-24 | OCTET3 | Fourth octet |
| 23-16 | OCTET2 | Third octet |
| 15-8 | OCTET1 | Second octet |
| 7-0 | OCTET0 | First octet |

Writing to the register (TX_FIFO0 Register) illustrated in Table 3 above causes the storage of a word to the network FIFO 916 through the alignment register 922. A word then may be transferred to the FIFO 916.

TABLE 4

TX_FIFO1 Register

| Bit | Name | Description |
| --- | --- | --- |
| 31-24 | Unused | |
| 23-16 | OCTET2 | Third octet |
| 15-8 | OCTET1 | Second octet |
| 7-0 | OCTET0 | First octet |

Writing to the register (TX_FIFO1 Register) illustrated in Table 4 above causes the storage of the lower 3 octets in the network FIFO 916 through the alignment register 922. Depending on a starting value in the alignment register, a word may or may not be written to the FIFO 916.

TABLE 5

TX_FIFO2 Register

| Bit | Name | Description |
| --- | --- | --- |
| 31-16 | Unused | |
| 15-8 | OCTET1 | Second octet |
| 7-0 | OCTET0 | First octet |

Writing to the register above (TX_FIFO2 Register) writes the lower 2 octets to the network FIFO through the alignment register. Depending on the starting value in the alignment register a word may or may not be written to the FIFO.

TABLE 6

TX_FIFO3 Register

| Bit | Name | Description |
| --- | --- | --- |
| 31-8 | Unused | |
| 7-0 | OCTET0 | First octet |

Writing to the register above (TX_FIFO3 Register) writes the lower 1 octet to the network FIFO through the alignment register. Depending on the starting value in the alignment register a word may or may not be written to the FIFO.

The processor issues single word writes to the FIFO registers. The data and the address are interpreted by the FIFO interface to generate transfers of between 1 and 4 octets. These octets are passed through the alignment interface that will combine them with any octets that it already has and generate an appropriate data word to be written to the FIFO.

FIG. 11 is a table illustrating alignment register interaction with FIFO registers in accordance with the present invention. The table 1100 of FIG. 11 shows how the alignment register is affected by the valid alignment octets and writes of data to the FIFO registers by the processor. In this example, the word values are little-endian and are shown as hexadecimal numbers, while register fields are shown in binary. "X" indicates a "don't care" value. Lower-case letters are used for arbitrary hexadecimal digits so it is possible to see the movements of individual octets. A dot "." in the middle of a hexadecimal number is used simply for visual clarity.

According to an embodiment of the present invention, device driver software running on the processor can make use of the DMA system. Examples include a single DMA from contiguous single buffer; multiple DMAs from a contiguous single buffer; multiple DMAs, multiple buffer fragments; insertion of extra field in packet; and ATM AAL5 transmission. Aspects of the present invention may be implemented in other applications as well.

For a single DMA from contiguous single buffer, to transmit a whole packet using a single DMA from a single contiguous buffer, the processor simply writes the DMA interface registers with the buffer address and buffer length. The ALIGN_KEEP flag should be off and the LAST flag should be on. The DMA system handles badly aligned buffers automatically, by reading an extra word if necessary to get all the packet data, and by using the first word to initialize the alignment register 922.

For multiple DMAs from a contiguous single buffer, it may be sometimes necessary to use multiple DMAs to transmit a packet even though it is held in a single contiguous buffer in memory. For example, this may be due to a size constraint in the transmission port itself. The only action which the software has to take is to set the ALIGN_KEEP flag for the second and subsequent DMAs to include any octets still in the alignment register from the previous DMA.

TABLE 7

| | DMA Address | DMA Length | ALIGN_KEEP | LAST |
| --- | --- | --- | --- | --- |
| First buffer fragment | Set to buffer address | Fragment length | 0 | 0 |
| Middle fragment | Set to fragment address | Fragment length | 1 | 0 |
| Last fragment | Set to fragment address | Fragment length | 1 | 1 |

For multiple DMAs and multiple buffer fragments, where the network packet is held in memory as several buffer fragments at different addresses, the driver does one DMA for each fragment. The DMA system may automatically include the octets left in the alignment register from the previous fragment.

TABLE 8

| | DMA Address | DMA Length | ALIGN_KEEP | LAST |
| --- | --- | --- | --- | --- |
| First fragment | Set to fragment address | Fragment length | 0 | 0 |
| Middle fragment | Set to fragment address | Fragment length | 1 | 0 |
| Last fragment | Set to fragment address | Fragment length | 1 | 1 |

For the insertion of an extra field in packet, the driver has a complete packet in a contiguous memory buffer, but needs to insert a 2-octet tag after the first 14 octets. The driver may split the packet transmission into two DMAs, and use the TX_FIFO2 register to insert the extra 2 octets:

TABLE 9

| | DMA Address | DMA Length | ALIGN_KEEP | LAST |
|---|---|---|---|---|
| Fragment before tag | Set to buffer address | 14 | 0 | 0 |
| Insert tag | Write 2-octet value to TX_FIFO2 register | | | |
| Fragment after tag | Set to buffer address + 14 | Buffer length – 14 | 1 | 1 |

For ATM AAL5 transmission, the driver has a complete packet in a contiguous memory buffer and transmits the complete packet as ATM cells in AAL5 format. In this example, each cell contains 48 octets of payload data from the buffer, and starts with a 4-octet header generated separately by the processor.

Since every transfer is an exact multiple of the word size, there will never be any octets left in the alignment register, so the ALIGN_KEEP and LAST flags can be unset for all transfers.

TABLE 10

| | DMA Address | DMA Length | ALIGN_KEEP | LAST |
|---|---|---|---|---|
| First cell: header | Write 4-octet header to TX_FIFO0 register | | | |
| First cell: payload | Set to buffer address | 48 | 0 | 0 |
| Second cell: header | Write 4-octet header to TX_FIFO0 register | | | |
| Second cell: payload | Set to buffer address + 48 | 48 | 0 | 0 |
| . | . | . | . | . |
| . | . | . | . | . |
| . | . | . | . | . |
| Last cell: header | Write 4-octet header to TX_FIFO0 register | | | |
| Last cell: payload | Set to buffer address + 48*N | 48 | 0 | 0 |

GlobespanVirata® Corporation's Helium™ 500 communications processor (Helium 500 CP) is a high performance ATM and Internet Protocol (IP) processor. Helium 500 CP offers an extended range of I/O options and features, providing great flexibility as well as an extended choice of operating systems for an application developer. Helium 500 CP uses a dual processor architecture to provide an efficient and flexible solution for a range of applications. The main CPU, the Protocol Processor (PP), runs the operating system and application software. Time critical tasks, such as servicing of I/O ports, ATM switching and ATM traffic shaping are handled by a second processor, the Network Processor (NP). This dual processor design frees the main CPU from constant interrupts, enabling very efficient use of the processor and memory bandwidth for application processing tasks. The Network Processor itself is made more efficient by the inclusion of independent DMA controller blocks in each of the high-performance I/O blocks. Use of these reduces the NP processing to the start and end of a packet only.

Figure 12:
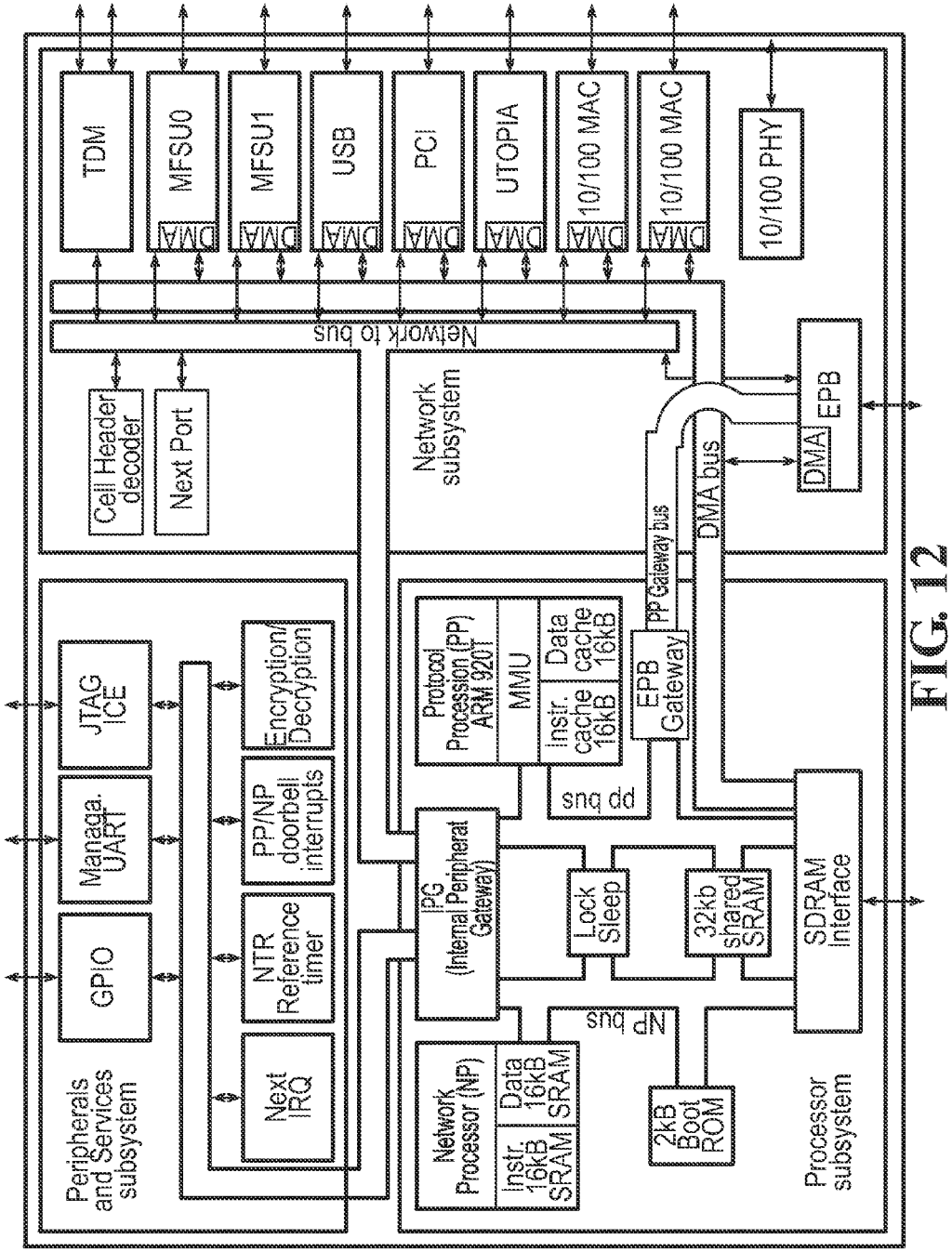
FIGS. 12-17 are illustrations of hardware architectures in which the inventive aspects of the present invention may be incorporated.

FIG. 12 is a schematic diagram of a hardware architecture in which the inventive aspects of the present invention may be incorporated. In particular, FIG. 12 illustrates a block diagram of Helium 500 CP incorporating the inventive aspects discussed above, in accordance with the present invention. The Helium 500 CP has at least three functional subsystems, which include a Processor subsystem, a Network subsystem and a Peripherals and Services subsystem. The Processor subsystem comprises a dual Advanced Reduced Instruction Set Computing (RISC) Machine (ARM) processor, shared memory and a common SRAM interface block. The Network subsystem provides high performance I/O connections and associated services. The Peripherals and Services subsystem provides a programmable General Purpose I/O (GPIO) connection, management and debug connections and additional services for the processors, including hardware encryption/decryption block for optimal network performance. This block also includes the system clocks and timers. These functional sub-systems are linked by high-performance buses, all of which operate at the same clock speed as the processors.

For its main CPU, the Helium 500 CP uses the powerful ARM 920 T processor running at 166 or 133 MHz, depending on product variant. Large data and instruction caches and a highly efficient Synchronous Dynamic Random Access Memory (SDRAM) controller further enhance performance. In addition, the inclusion of a memory management unit (MMU) allows the use of a wider choice of operating systems for application development. Applications for the Helium 500 CP can be developed using any of the Atmos operating system, from GlobespanVirata® Corporation; VxWorkS™, from Windriver™, Linux™ and others. For its second process, the Helium 500 CP uses the high-performance ARM 966 E-S processor, also running at 166 or 133 MHz, depending on product variant. For maximum data transfer efficiency, the NP shares SRAM and the SDRAM controller with the PP.

The Helium 500 CP incorporates a wide range of I/O blocks, making it an ideal platform for applications requiring cell, frame and Time Division Multiplexing (TDM) connectivity. In addition to its on-board I/O capabilities, the Helium 500 CP provides expansion ports dedicated to state-of-the-art peripheral devices. Its external peripheral bus (EPB) supports Motorola™ or Intel™-type peripheral devices, as well as Personal Computer Memory Card International Association (PCMCIA) peripheral devices. For very high performance peripherals, the Helium 500 CP includes a Peripheral Component Interconnect (PCI) expansion bus and system controller. The PCI bus has a direct path to system memory, allowing peripherals to DMA data directly.

Each of the Network I/O blocks, except for the TDM block, includes a dedicated DMA engine. These share a dedicated DMA bus, through which they connect directly to the SDRAM controller. The DMA system allows data transfers between the I/O blocks and external SDRAM to be performed with minimal intervention from the processors.

The Helium 500 communications processor has the following key features: choice of operating system support from Atmos from GlobespanVirata® Corporation, VxWorks™ from WindRiver™; and Linux™; Protocol Processor (PP) as the main CPU: High-performance ARM 9 with MMU, 16 KB data cache, 16 KB instruction cache; separate ARM 9 Network Processor (NP) off-loads time-critical tasks from PP, 32 KB private "tightly coupled" Static Random Access Memory (SRAM) on chip: 16 KB data, 16 KB instruction space; product variants with 166 MHz and 133 MHz processor speeds, memory systems designed to optimize throughput of data: additional 32 KB SRAM shared between the two processors, high performance SDRAM controller, shared by the two processors, operates synchronously with processors; supports up to 128 MB external DRAM; high-performance DMA systems, optimized for efficient handling of communications data: each high-bandwidth I/O block has its own dedicated DMA engine, a common full-speed 32 bit bus links the DMA engines directly to the SDRAM controller; in normal operation, the NP will initiate a DMA transfer where no further NP processing is required until the transfer has completed, functions such as checksum calculation and byte alignment can be performed while the data is being transferred, Nextport logic block determines which I/O port service request has the highest priority, removing need for any polling of I/O ports by the processor, similarly, a Next Interrupt Request (IRQ) block prioritizes outstanding IRQs without processor intervention; dual 10/100 Mb/s Ethernet Media Access Controllers (MACs); Encryption/Decryption hardware accelerator (with Internet Protocol Security (IPSec) support), supported by hardware random number generator: encrypts and decrypts data as defined in FIBS BUS 81, single or triple Data Encryption Standard (DES) modes; supports Electronic Code Book (ECB), Cipher Block Chaining (CBC), Output Feedback (cryptography) (OFB)-64, incorporates Secure Hashing Algorithm according to FIPS PUB 180-1 (SHA-1) hardware assist function; two high-speed multifunction serial units (MFSUs), each of which is configured to operate in one of three modes: High-Level Data Link Control (HDLC) mode conforms to q.921 and ISO/IEC 2209:1993, supports bus mode, V.35 and X.21 fixed links operating at up to 50 Mb/s, hardware support for 16 and 32 bit Frame Checking Sequence (FCS); 1.432 Mode is in accordance with International Telecommunication Union-Telecommunications (ITU-T) 1.432 interface standard at 50 Mb/s data rate; High-speed Serial Universal Asynchronous Receiver and Transmitter (UART) mode, supporting both 3-wire and 5-wire interfaces (software or hardware flow control) at 1.5 Mb/s data rate, suitable for connection to Bluetooth devices; TDM block provides two independent TDM interfaces with flexible HDLC controllers, each offering data rate up to 8 Mb/s; up to 256 programmable time-slots, up to 32 simultaneous HDLC streams, with single or multiple time-slots and programmable number of bits per slot; ability to support "quad" framer devices (carrying up to four T1/E1 channels); UTOPIA master/slave port offers UTOPIA level 1 or 2 ports, master or slave operation, provides up to 31 ports, first 8 ports can be configured for high-speed operation; Network Timing Reference (NTR) recovery function, can also provide local network clock generation; PCI expansion bus for high-speed, flexible peripheral connection: 32 bit, 33 MHz bus, PCI master or slave operation, in-built arbiter with support for up to two peripheral devices for operation in master mode, PCI Rev 2.2 complaint; External peripheral bus (EPB) for co-processor or peripheral expansion: supports 8, 16 and 32 bit bus widths, offers support for i960, Motorola, Intel and PCMCIA bus formats, programmable strobes allows support for other formats; Universal Serial Bus (USB) 1.1 slave port operates at 12 Mhz; Programmable GPIO block with up to 64 I/O pins available, each configurable as input or output, allows interfacing to local device (e.g., for driving indicators or sensing switches); support for IEEE 1149.1 boundary scan and ARM In-Circuit Emulator (ICE) debugger; Compatible with GlobespanVirata Corporation Helium family of products and IP Service Operating System (ISOS) software; designed throughout for low-power operation, many operational blocks can be put into standby mode to save power.

Figure 13:
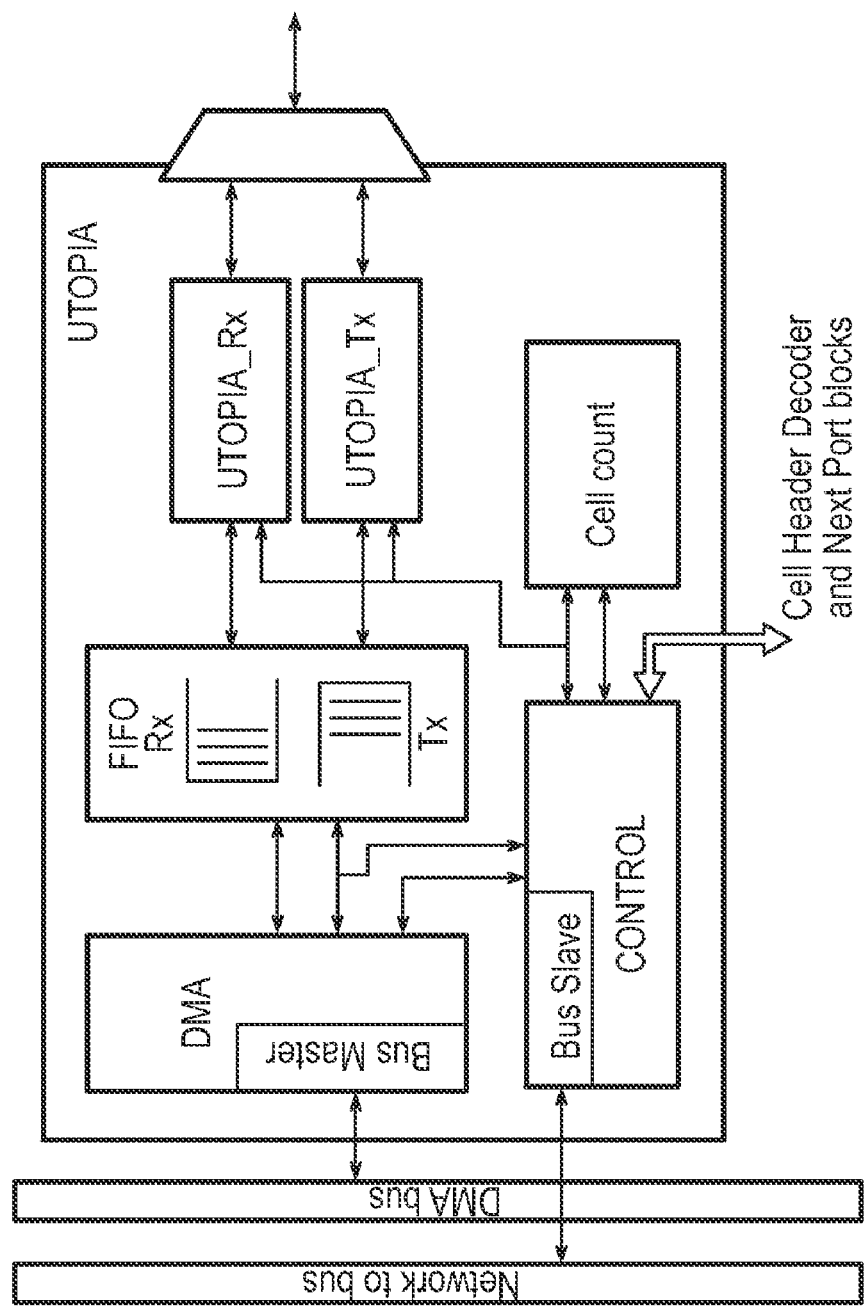

FIG. 13 is a schematic diagram of a hardware architecture in which the inventive aspects of the present invention may be incorporated. In particular, FIG. 13 is a UTOPIA block functional overview incorporating the inventive features discussed in detail above. The Helium 500 CP provides a single UTOPIA interface which can operate in the following four modes: UTOPIA level 2 Master (L2M) up to 31 ports; UTOPIA Level 2 Slave (L2S) single port (port number between 0 and 30); UTOPIA Level 1 Master (L1M) single port (port 0); and UTOPIA level 1 slave (L1S) single port (port 0).

As shown in FIG. 13, the main data path through the block passes (in the reverse direction) from the external connections, through the UTOPIA Rx processor, to the First In First Out (FIFO) block. The DMA engine, which forms part of the block, transfers data from the FIFO onto the DMA bus and then directly into SDRAM. The transmit data path is simply the reverse of this, passing from the FIFOs through the UTOPIA Tx processor block. In addition, the UTOPIA block control logic is connected to the Network I/O bus, and can also access the FIFOs. A cell counter unit is also provided; this tracks the number of cells transmitted and received on each port. The block provides highly-flexible support for the prioritization of some ports for high-speed operation. Separate FIFOs are provided for Transmit and Receive data. The organization of the FIFOs depends on the operating mode of the block; however each active port is always provided with at least a single cell (e.g., 13-word) buffer. The FIFO hardware provides synchronization between the different clock domains of the UTOPIA block, where this is required.

Figure 14:
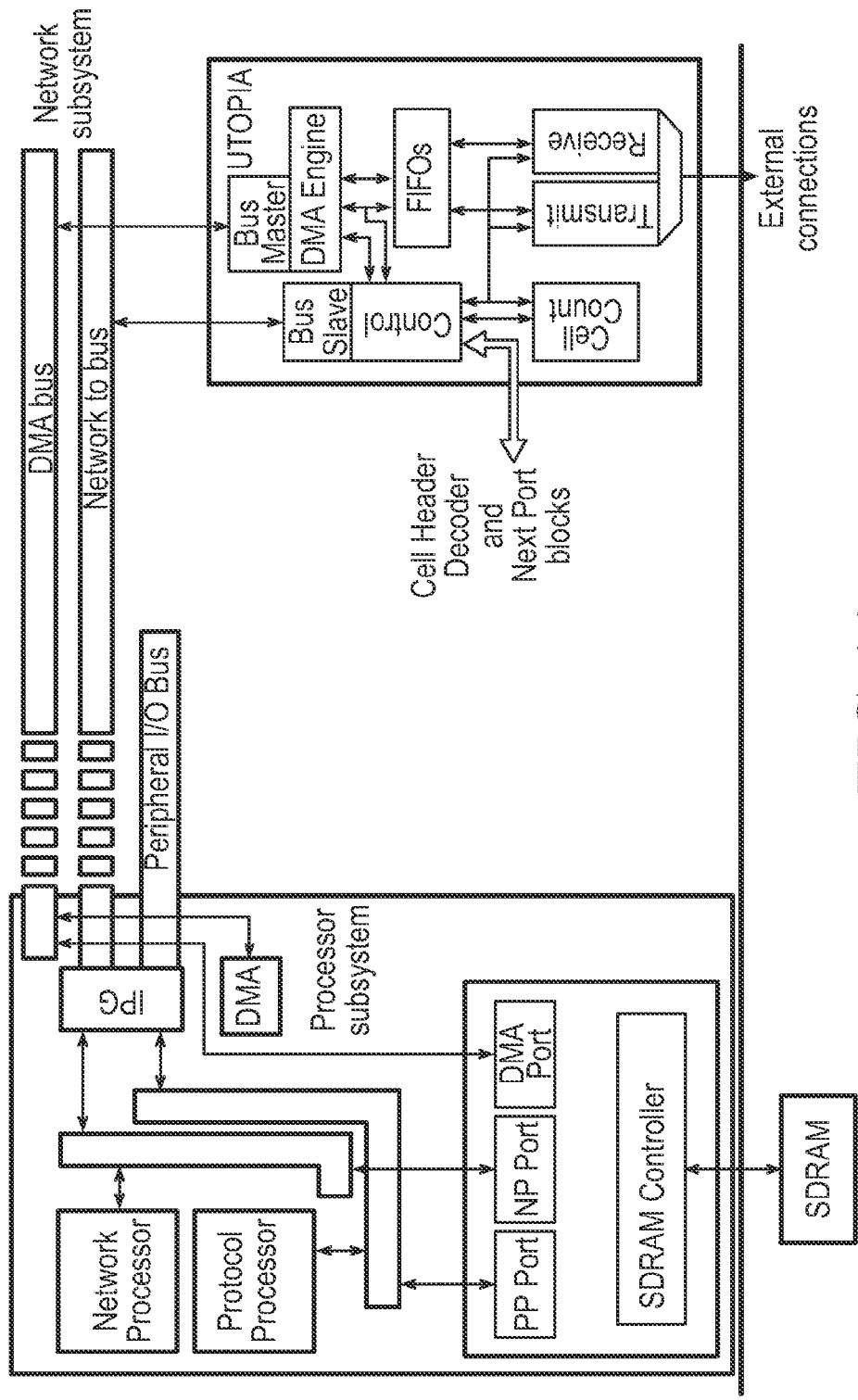

FIG. 14 is a schematic diagram of a hardware architecture in which the inventive aspects of the present invention may be incorporated. In particular, FIG. 14 illustrates the relation of the UTOPIA block to the Helium 500 CP architecture. This diagram indicates how the UTOPIA block's DMA engine transfers data directly to external SDRAM, via the DMA bus and the SDRAM controller, without any intervention from the processors. It also indicates the direct connections between the UTOPIA block and the Next Port and Cell Header Decoder blocks of the Network subsystem.

Figure 15:
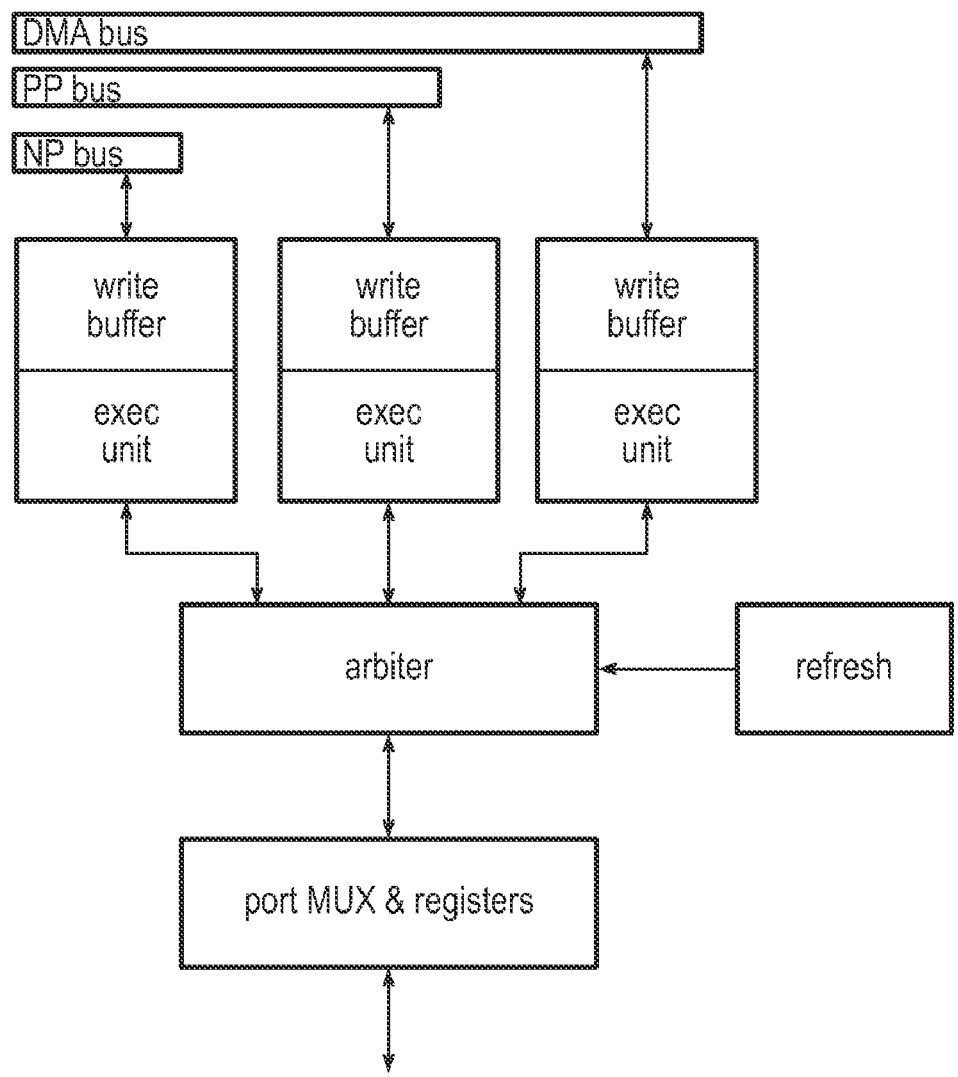

FIG. 15 is a schematic diagram of a hardware architecture in which the inventive aspects of the present invention may be incorporated. In particular, FIG. 15 illustrates a SDRAM block diagram. The SDRAM controller provides a high-performance interface to external SDRAMs for code and data storage. It operates at the processor core clock frequency of 166 or 133 MHz, and is compatible with the Joint Electronic Device Engineering Counsel (JEDEC) standard JED2421 for interfacing to synchronous DRAMs. The controller has three internal ports allowing the DMA controller, the NP and the PP to access SDRAM via separate internal buses. The controller features independent write data and address buffering on each port (e.g., 16 word data buffer on each port (DMA, NP and PP ports); 1 address buffer per port); intelligent arbitration between the three ports where the arbitration scheme dynamically adjusts to the load conditions and also guarantees maximum latency requirements at each port; and advanced SDRAM interleaving where the SDRAM controller re-orders memory cycles to optimize data transfer. It does this may automatically interleaving banks of memory with in the SDRAM devices. The overhead of preparing one bank is hidden during data movement to the other. This process is entirely transparent to the user. Other features include data coherency guarantee where the controller guarantees data coherency between ports (e.g., data in a write buffer on one port can be accessed by a read from another port) and support for memory devices sizes of 64 Mb, 128 Mb and 256 Mb, each of which can be 8, 16 or 32 bits wide, the maximum memory that can be connected is 4×256 Mb (128 MB). Generally, access to the external SDRAM is 32-bits wide. Another feature includes a power down mode where a low power mode drastically reduces the power consumed by external SDRAM devices.

Figure 16:
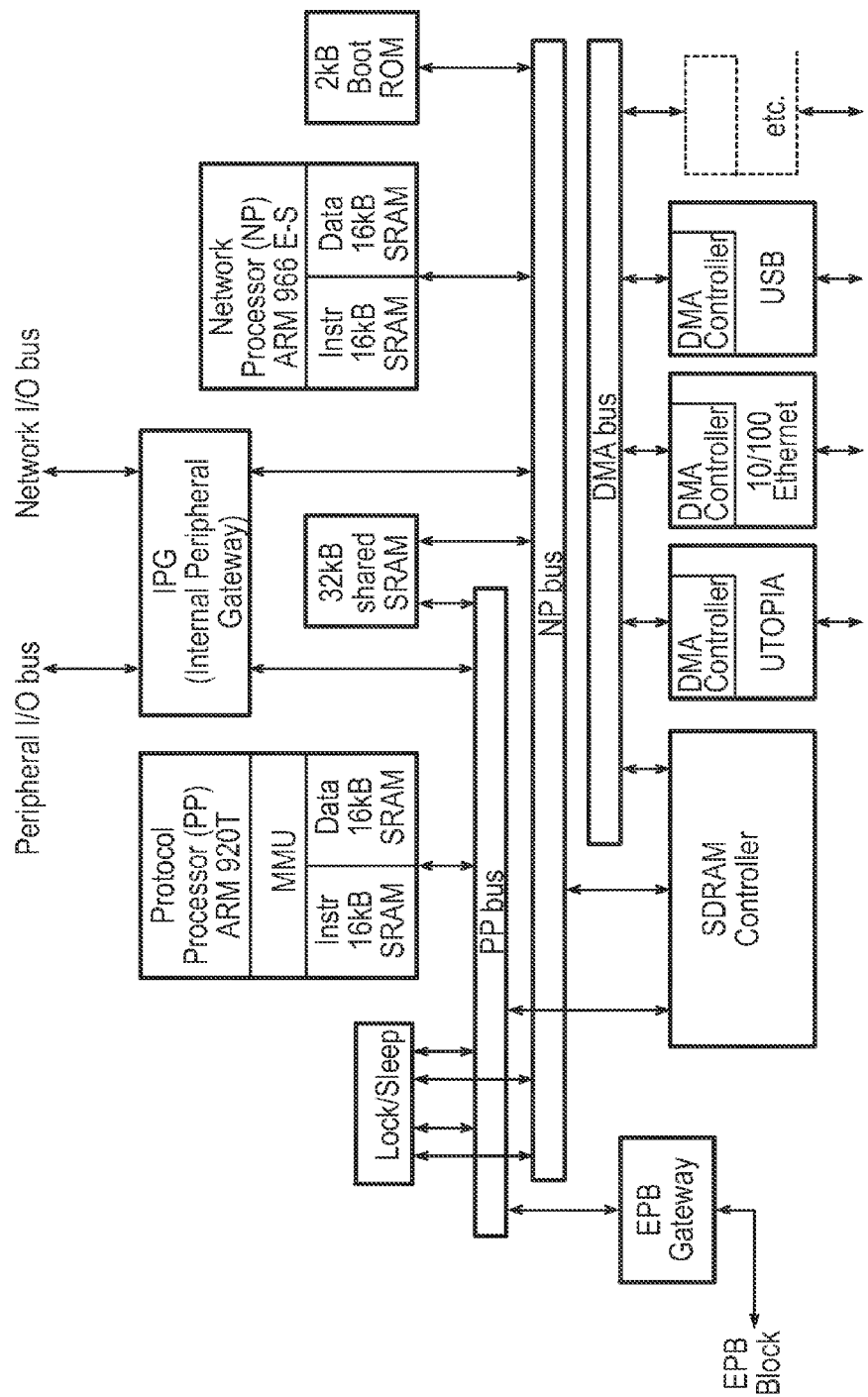

FIG. 16 is a schematic diagram of a hardware architecture in which the inventive aspects of the present invention may be incorporated. In particular, FIG. 16 illustrates a core system including processors and DMAs. A principle use of the DMA system is for the NP to transfer data packets and cells between SDRAM buffers and network ports. The DMA system may include a DMA engine within each of the high performance I/O blocks and a dedicated DMA bus linking these engines to the SDRAM controller. This enables the NP to interleave operations efficiently on different devices without being stalled by SDRAM accesses. The DMA channels carry out functions such as checksum calculation and byte alignment as the data is transferred. The PP may also make use of DMA channels, for example to access devices attached to the EFB.

Figure 17:
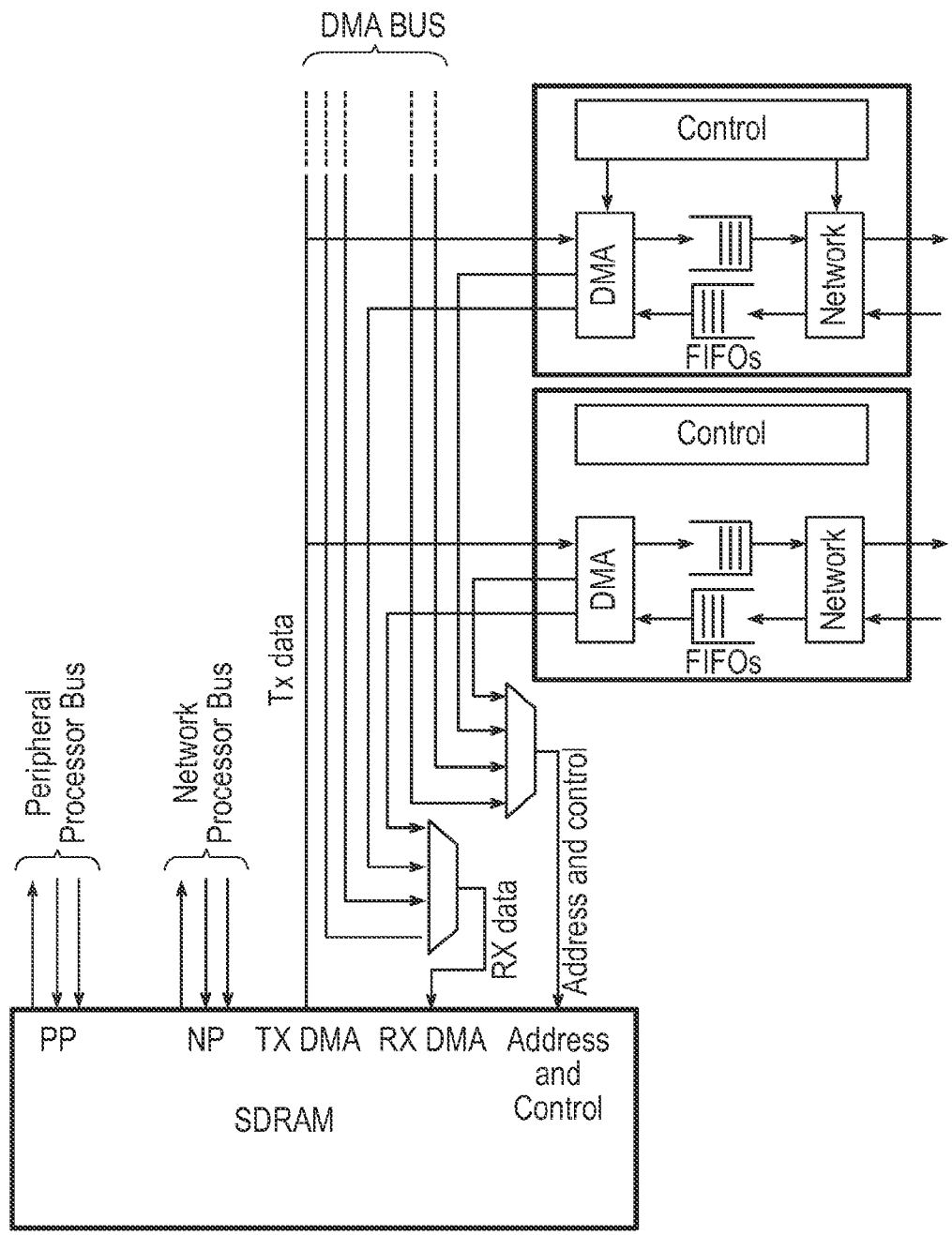

FIG. 17 is a schematic diagram of a hardware architecture in which the inventive aspects of the present invention may be incorporated. In particular, FIG. 17 is a DMA block diagram. The DMA system reduces the reliance on NP when transferring data between high-speed I/O modules and the SDRAM memory. The system includes a DMA controller within each of the high-speed I/O modules, connecting directly to the Transmit and Receive FIFOs within the module; a dedicated DMA port on the SDRAM controller; and a dedicated high-speed 32-bit DMA bus, linking the DMA controllers to the SDRAM controller. DMA transfers between the network module FIFOs and the SDRAM take place in parallel with other NP operations; NP processing is required only at the start and end of the packet or cell. Each DMA controller is able to discard packets that do not need to be received. A single DMA transfer across the bus (e.g., a burst) is between one and 16 words. The 16 word limit prevents any device from "hogging" the DMA bus. Where larger DMA data transfers are required they are split into multiple 16-word bursts, automatically. Write performance is enhanced by buffering in the SDRAM controller. The addressable memory range of the DMA controllers is 256 MB, although the SDRAM controller limits the usable address range of 128 MB.

The DMA system illustrated in FIG. 17 includes two exemplary I/O blocks. Additional I/O blocks may be implemented. The control block without each of the I/O blocks is connected to the Network I/O. For clarify, these connections have been omitted from the diagram. The SDRAM controller shown in FIG. 17 provides write buffering on its input from the DMA bus, optimizing the performance of write operations.

Data transfers within the Helium 500 CP will normally take place under the control of the Network Processor (NP), responding to service requests provided through the Next Port mechanism. The Helium 500 CP allows other modes of operation; for example, DMA transfers could be driven by interrupts from the I/O ports. DMA transfers involve the inter-operation of the I/O block and the DMA block. Each I/O block which uses the DMA engine has two groups of registers, the I/O block-specific registers and the DMA registers. The I/O block-specific registers control data transfers (e.g., transmission and reception) between the I/O block and the external network and may be highly block specific. The DMA registers control DMA data transfer between the I/O block and the SDRAM and are essentially the same for each block, although not all of the DMA registers are provided in all I/O blocks. To set up a network data transfer (e.g., transmit or receive), I/O block-specific registers will be used to set up the transmit or receive operations and the DMA registers will be used to set up the data transfer between the I/O block and the SDRAM. Data is transferred directly between SDRAM and the FIFOs of the I/O block, under the control of the DMA engine and without any intervention from the NP. Burst transfers across the DMA bus are limited to a maximum of 16 words; if the requested transfer is longer than this it will be split into multiple 16-word bus transfers, and DMA bus arbitration will take place after each burst. With transmit operations, signaling within the DMA system ensures that data is only transferred across the DMA bus if the FIFO has space to receive it. The I/O block is responsible for detecting the recovering from data over- or under-run conditions, and may abort the DMA transfer (e.g., if it is unable to transmit data from the FIFO to free up space for the requested data transfer). When the entire data transfer has been completed the DMA block raises a service request to indicate the fact. The I/O block may then need to perform additional processing to complete the operation.

While the foregoing description includes many details and specificities, it is to be understood that these have been included for purposes of explanation only, and are not to be interpreted as limitations of the present invention. Many modifications to the embodiments described above can be made without departing from the spirit and scope of the invention.

The present invention is not to be limited in scope by the specific embodiments described herein. Indeed, various modifications of the present invention, in addition to those described herein, will be apparent to those of ordinary skill in the art from the foregoing description and accompanying drawings. Thus, such modifications are intended to fall within the scope of the following appended claims. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes. Accordingly, the claims set forth below should be construed in view of the full breath and spirit of the present invention as disclosed herein.

What is claimed is:

1. A method for transferring network packet data that is stored in memory to an output device, the method comprising the steps of:

concatenating one or more packet data octets from at least a first data word having at least one packet data octet to be included in a network packet to generate a first sequence of packet data octets having an octet length at least as great as an octet length of a data word;

storing the first sequence of packet data octets in a FIFO buffer operably connected to the output device when the octet length of the sequence of packet data octets is equal to the octet length of a data word; and storing a first subset of packet data octets from the first sequence of packet data octets in the FIFO buffer and storing a remaining second subset of packet data octets from the first sequence in an alignment register when the octet length of the first sequence of packet data octets exceeds the octet length of a data word, wherein an octet length of the first subset of packet data octets is equal to the octet length of a data word, wherein data received at the alignment register is received from a direct memory access (DMA) component.

2. The method as in claim 1, further comprising the step of storing the first sequence of packet data octets in the alignment register when the octet length of the first sequence of packet data octets is less than the octet length of a data word.

3. The method as in claim 1, further comprising the steps of:

concatenating at least one packet data octet from a second data word accessed from memory with the second subset of packet data octets stored in the alignment register to generate a second sequence of packet data octets having a octet length at least as great as the octet length of a data word;

storing the second sequence of packet data octets in the FIFO buffer when the octet length of the sequence of packet data octets is equal to the octet length of a data word; and storing a first subset of packet data octets from the second sequence of packet data octets in the FIFO buffer and storing a remaining second subset of packet data octets from the second sequence the alignment register when the octet length of the second sequence of packet data octets exceeds the octet length of a data word, wherein an octet length of the first subset of packet data octets of the second sequence is equal to the octet length of a data word.

4. The method as in claim 1, wherein the octet length of a data word is an integer multiple of four.

5. A system for transferring network packet data stored in memory to an output device, the system comprising:
- a direct memory access (DMA) interface for accessing a set of data words stored in memory, each data word having at least one valid octet to be included in a network packet and each data word being accessed using a DMA address associated with the data word;
- a first in-first out (FIFO) buffer for storing network packet data to be transmitted by the output device; and
- an alignment block having at least one alignment register, wherein the alignment register for storing at least one data octet, and wherein the alignment block is adapted to:
  - concatenate one or more packet data octets from at least a first data word having at least one packet data octet to be included in a network packet to generate a first sequence of packet data octets having an octet length at least as great as an octet length of a data word;
  - store the first sequence of packet data octets in a FIFO buffer operably connected to the output device when the octet length of the sequence of packet data octets is equal to the octet length of a data word; and
  - store a first subset of packet data octets from the first sequence of packet data octets in the FIFO buffer and store a remaining second subset of packet data octets from the first sequence in an alignment register when the octet length of the first sequence of packet data octets exceeds the octet length of a data word, wherein an octet length of the first subset of packet data octets is equal to the octet length of a data word.

6. The system as in claim 5, wherein the alignment block is further adapted to store the first sequence of packet data octets in the alignment register when the octet length of the first sequence of packet data octets is less than the octet length of a data word.

7. The system as in claim 5, wherein the alignment block is further adapted to:
- concatenate at least one packet data octet from a second data word accessed from memory with the second subset of packet data octets stored in the alignment register to generate a second sequence of packet data octets having a octet length at least as great as the octet length of a data word;
- store the second sequence of packet data octets in the FIFO buffer when the octet length of the sequence of packet data octets is equal to the octet length of a data word; and
- store a first subset of packet data octets from the second sequence of packet data octets in the FIFO buffer and storing a remaining second subset of packet data octets from the second sequence the alignment register when the octet length of the second sequence of packet data octets exceeds the octet length of a data word, wherein an octet length of the first subset of packet data octets of the second sequence is equal to the octet length of a data word.

8. The system as in claim 5, wherein the octet length of a data word is an integer multiple of four.

9. The system as in claim 5, wherein the alignment block further includes at least one FIFO register and is further adapted to store at least a third sequence of one or more packet data octets from a processor in the FIFO register.

10. The system as in claim 9, wherein the alignment block is further adapted to store the third sequence of packet data octets in the FIFO buffer when an octet length of the third sequence is equal to the octet length of a data word.

11. The system as in claim 9, wherein the alignment block is further adapted to concatenate at least a subset of the third sequence of packet data octets with a sequence of packet data octets stored in the alignment register to generate a fourth sequence of packet data octets and store the fourth sequence of packet data octets in the FIFO buffer when an octet length of the fourth sequence is equal to the octet length of a data word.

12. The system as in claim 9, wherein the alignment block is further adapted to concatenate at least a subset of the third sequence of packet data octets with a sequence of packet data octets stored in the alignment register to generate a fourth sequence of packet data octets and store a first subset the fourth sequence of packet data octets in the FIFO buffer and a remaining second subset of the fourth sequence of packet at octets in the alignment register when an octet length of the fourth sequence exceeds the octet length of a data word.

13. The system as in claim 9, wherein the alignment block is further adapted to concatenate at least a subset of the third sequence of packet data octets with a sequence of packet data octets stored in the alignment register to generate a fourth sequence of packet data octets and store the fourth sequence of packet data octets in the alignment register when an octet length of the fourth sequence is less than the octet length of a data word.

14. A system for transferring network packet data stored in memory to an output device, the system comprising:
- means for accessing a set of data words stored in memory, each data word having at least one valid octet to be included in a network packet and each data word being accessed using a DMA address associated with the data word;
- means for concatenating one or more of the at least one packet data octet having at least one packet data octet to be included in a network packet to generate a first sequence of packet data octets having an octet length at least as great as an octet length of a data word;
- means for storing the first sequence of packet data octets in a FIFO buffer operably connected to the output device when the octet length of the sequence of packet data octets is equal to the octet length of a data word; and
- means for storing a first subset of packet data octets from the first sequence of packet data octets in the FIFO buffer and storing a remaining second subset of packet data octets from the first sequence in an alignment register when the octet length of the first sequence of packet data octets exceeds the octet length of a data word, wherein an octet length of the first subset of packet data octets is equal to the octet length of a data word.

15. The system as in claim 14, further comprising means for storing the first sequence of packet data octets when the octet length of the first sequence of packet data octets is less than the octet length of a data word.

16. The system as in claim 14, further comprising means for concatenating at least one packet data octet from a second data word accessed from memory with the second subset of packet data octets to generate a second sequence of packet data octets having a octet length at least as great as the octet length of a data word.

17. The system as in claim 16, further comprising means for storing the second sequence of packet data octets when the octet length of the sequence of packet data octets is equal to the octet length of a data word.

18. The system as in claim 17, further comprising means for storing a first subset of packet data octets from the second sequence of packet data octets in the FIFO buffer.

19. The system as in claim 18, further comprising means for storing a remaining second subset of packet data octets from the second sequence the alignment register when the octet length of the second sequence of packet data octets exceeds the octet length of a data word, wherein an octet length of the first subset of packet data octets of the second sequence is equal to the octet length of a data word.

20. The system as in claim 14, wherein the octet length of a data word is an integer multiple of four.

\* \* \* \* \*